US011490113B2

(12) United States Patent
Huo et al.

(10) Patent No.: US 11,490,113 B2
(45) Date of Patent: Nov. 1, 2022

(54) PROCESSING METHOD FOR MOTION COMPENSATION, ENCODER, AND DECODER

(71) Applicant: GUANGDONG OPPO MOBILE TELECOMMUNICATIONS CORP., LTD., Guangdong (CN)

(72) Inventors: Junyan Huo, Dongguan (CN); Yanzhuo Ma, Dongguan (CN); Shuai Wan, Dongguan (CN); Fuzheng Yang, Dongguan (CN); Ze Guo, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/643,522

(22) Filed: Dec. 9, 2021

(65) Prior Publication Data

US 2022/0103857 A1 Mar. 31, 2022

Related U.S. Application Data

(63) Continuation of application No. PCT/CN2019/092829, filed on Jun. 25, 2019.

(51) Int. Cl.
*H04N 19/137* (2014.01)
*H04N 19/176* (2014.01)
(Continued)

(52) U.S. Cl.
CPC ........ *H04N 19/517* (2014.11); *H04N 19/137* (2014.11); *H04N 19/176* (2014.11); *H04N 19/182* (2014.11)

(58) Field of Classification Search
None
See application file for complete search history.

(56) References Cited

U.S. PATENT DOCUMENTS 8,462,850 B2 * 6/2013 Mohan ................ H04N 19/43
375/240.06
2010/0013757 A1 * 1/2010 Ogikubo .............. G11B 27/034
345/156

(Continued)

FOREIGN PATENT DOCUMENTS

| CN | 101795409 A | 8/2010 |
| CN | 105532004 A | 4/2016 |
| CN | 105959705 A | 9/2016 |

OTHER PUBLICATIONS

International Search Report issued in corresponding international application No. PCT/CN2019/092829 dated Mar. 27, 2020.
(Continued)

*Primary Examiner* — Mohammad J Rahman
(74) *Attorney, Agent, or Firm* — Perkins Coie LLP

(57) ABSTRACT

Processing methods for motion compensation, an encoder, and a decoder are provided. The method includes the following. Determine a search position constellation with a point pointed by an initial motion vector as a center point, where the search position constellation includes N directions, search for at least one search point by using at least one type of step lengths in the directions, where the at least one search point at least includes at least one search point in diagonal directions. Search for at least one search position from the search position constellation based on a preset range coverage rule, where the preset range coverage rule is to arrange search points in the directions for search. Obtain a new motion vector according to the at least one search position, and perform motion compensation based on the new motion vector to obtain a prediction value of a coding unit (CU).

12 Claims, 7 Drawing Sheets

(51) Int. Cl.
  *H04N 19/182* (2014.01)
  *H04N 19/517* (2014.01)

(56) References Cited

U.S. PATENT DOCUMENTS

| | | | | |
|---|---|---|---|---|
| 2013/0202037 A1* | 8/2013 | Wang | H04N | 19/159 |
| | | | | 375/E7.125 |
| 2015/0235414 A1* | 8/2015 | Zheng | H04N | 13/261 |
| | | | | 345/420 |
| 2016/0173888 A1 | 6/2016 | Park et al. | | |
| 2017/0142438 A1 | 5/2017 | Hepper | | |
| 2017/0208341 A1* | 7/2017 | Kulakov | H04N | 19/57 |
| 2018/0063547 A1* | 3/2018 | Kobayashi | H04N | 19/129 |
| 2018/0338156 A1* | 11/2018 | Morigami | H04N | 19/57 |
| 2019/0037240 A1* | 1/2019 | Schmit | H04N | 19/57 |
| 2019/0268594 A1* | 8/2019 | Lim | H04N | 19/122 |
| 2020/0177877 A1* | 6/2020 | Chen | H04N | 19/176 |
| 2020/0228810 A1* | 7/2020 | Batard | H04N | 19/433 |
| 2020/0404318 A1* | 12/2020 | Matsumoto | H04N | 19/61 |
| 2021/0127112 A1* | 4/2021 | Choi | H04N | 19/12 |
| 2021/0152844 A1* | 5/2021 | Jeong | H04N | 19/176 |
| 2021/0195199 A1* | 6/2021 | Choi | H04N | 19/119 |
| 2021/0218962 A1* | 7/2021 | Lim | H04N | 19/186 |
| 2021/0392356 A1* | 12/2021 | Chujoh | H04N | 19/139 |

OTHER PUBLICATIONS

JVET-N0142, CE4-3.4: Diagonal direction candidate for MMVD.
JVET-M0307-r3, CE4-related : Candidates optimization on MMVD.
JVET-N0441, CE4-3.3 : Candidates optimization on MMVD.
JVET-L0054, CE4 Ultimate motion vector expression (Test 4.5.4).
JVET-L0355_r1, Non-CE4: Enhanced ultimate motion vector expression.
JVET-L0408-v2, CE4-related: Improvement on ultimate motion vector expression.
JVET-M0060, CE4: Enhanced Merge with MVD (Test 4.4.4).
JVET-M0061_r1, CE4: Combination of CE4.4.4a and CE4.4.5c (Test 4.4.4.e).
JVET-M0291, CE 4: Extension on MMVD (Test 4.2.5).
Extended European Search Report of the European application No. 19935161.0 dated May 9, 2022. 8 pages.
First Examination Report of the Indian application No. 202127058640, dated May 26, 2022. 5 pages with English Translation.
Yang et al. "Description of Core Experiment 4 (CE4): Inter prediction and motion vector coding" 12th meeting: Macao, CN; Oct. 3-12, 2018. 15 pages.

* cited by examiner

PROCESSING METHOD FOR MOTION COMPENSATION, ENCODER, AND DECODER

CROSS-REFERENCE TO RELATED APPLICATION(S)

This application is a continuation of International Application No. PCT/CN2019/092829, filed on Jun. 25, 2019, the entire disclosure of which is hereby incorporated by reference.

TECHNICAL FIELD

Implementations of the present disclosure relate to the technical field of video coding and decoding, and in particular, to processing methods for motion compensation, an encoder, and a decoder.

BACKGROUND

Merge with motion vector difference (MMVD) technology, which is used in skip and merge modes in inter prediction, is a special expression of motion vectors. The MMVD technology is realized mainly through the following process: reuse motion vector merging candidates in versatile video coding (VVC), and among the candidates, select one candidate as an initial motion vector, and then expand the initial motion vector through the following methods. Some simple syntax elements, mainly including a starting point, a motion magnitude, and a motion direction, are used to obtain a final expansion expression of the motion vector, thereby forming a new motion vector. However, at present, the above solution is difficult to meet motion conditions of most objects, resulting in insufficient accuracy of motion information that can be expressed.

SUMMARY

Implementations of the present disclosure provide processing methods for motion compensation, an encoder, and a decoder.

In a first aspect, implementations of the present disclosure provide a processing method for motion compensation. The method is applied to a decoder and includes the following. Determine a search position constellation with a point pointed by an initial motion vector as a center point, where the search position constellation includes N directions, search for at least one search point by using at least one type of step lengths in the directions, N is an integer larger than or equal to 1, where the at least one search point at least includes at least one search point in diagonal directions, and the diagonal directions are respectively: upper left, lower left, upper right, and lower right relative to the center point. Search for at least one search position from the search position constellation based on a preset range coverage rule, where the preset range coverage rule is to arrange search points in the directions for search. Obtain a new motion vector according to the at least one search position, and perform motion compensation based on the new motion vector to obtain a prediction value of a coding unit (CU).

In a second aspect, implementations of the present disclosure provide a processing method for motion compensation. The method is applied to an encoder and includes the following. Determine a search position constellation with a point pointed by an initial motion vector as a center point, where the search position constellation includes N directions, search for at least one search point by using at least one type of step lengths in the directions, N is an integer larger than or equal to 1, where the at least one search point at least includes at least one search point in diagonal directions, and the diagonal directions are respectively: upper left, lower left, upper right, and lower right relative to the center point. Search for at least one search position from the search position constellation based on a preset range coverage rule, where the preset range coverage rule is to arrange search points in the directions for search. Obtain a new motion vector according to the at least one search position, and perform motion compensation based on the new motion vector to obtain a prediction value of a CU.

In a third aspect, implementations of the present disclosure provide a decoder. The decoder includes a processor and a memory storing a computer program which, when executed by the processor, causes the processor to perform the following. Determine a search position constellation with a point pointed by an initial motion vector as a center point, where the search position constellation includes N directions, search for at least one search point by using at least one type of step lengths in the directions, N is an integer larger than or equal to 1, where the at least one search point at least includes at least one search point in diagonal directions, and the diagonal directions are respectively: upper left, lower left, upper right, and lower right relative to the center point. Search for at least one search position from the search position constellation based on a preset range coverage rule, where the preset range coverage rule is to arrange search points in the directions for search. Obtain a new motion vector according to the at least one search position, and perform motion compensation based on the new motion vector to obtain a prediction value of a CU.

In a fourth aspect, implementations of the present disclosure provide an encoder. The encoder includes a processor and a memory storing a computer program which, when executed by the processor, causes the processor to perform the following. Determine a search position constellation with a point pointed by an initial motion vector as a center point, where the search position constellation includes N directions, search for at least one search point by using at least one type of step lengths in the directions, N is an integer larger than or equal to 1, where the at least one search point at least includes at least one search point in diagonal directions, and the diagonal directions are respectively: upper left, lower left, upper right, and lower right relative to the center point. Search for at least one search position from the search position constellation based on a preset range coverage rule, where the preset range coverage rule is to arrange search points in the directions for search. Obtain a new motion vector according to the at least one search position, and perform motion compensation based on the new motion vector to obtain a prediction value of a CU.

DETAILED DESCRIPTION

Technical solutions in implementations of the present disclosure will be clearly and completely described below in conjunction with accompanying drawings in the implementations of the present disclosure. It can be understood that specific implementations described here are only used to explain the related disclosure, but not to limit the present disclosure. In addition, it is to be noted that, for ease of illustration, only parts related to the related disclosure are illustrated in the accompanying drawings.

Figure 1:
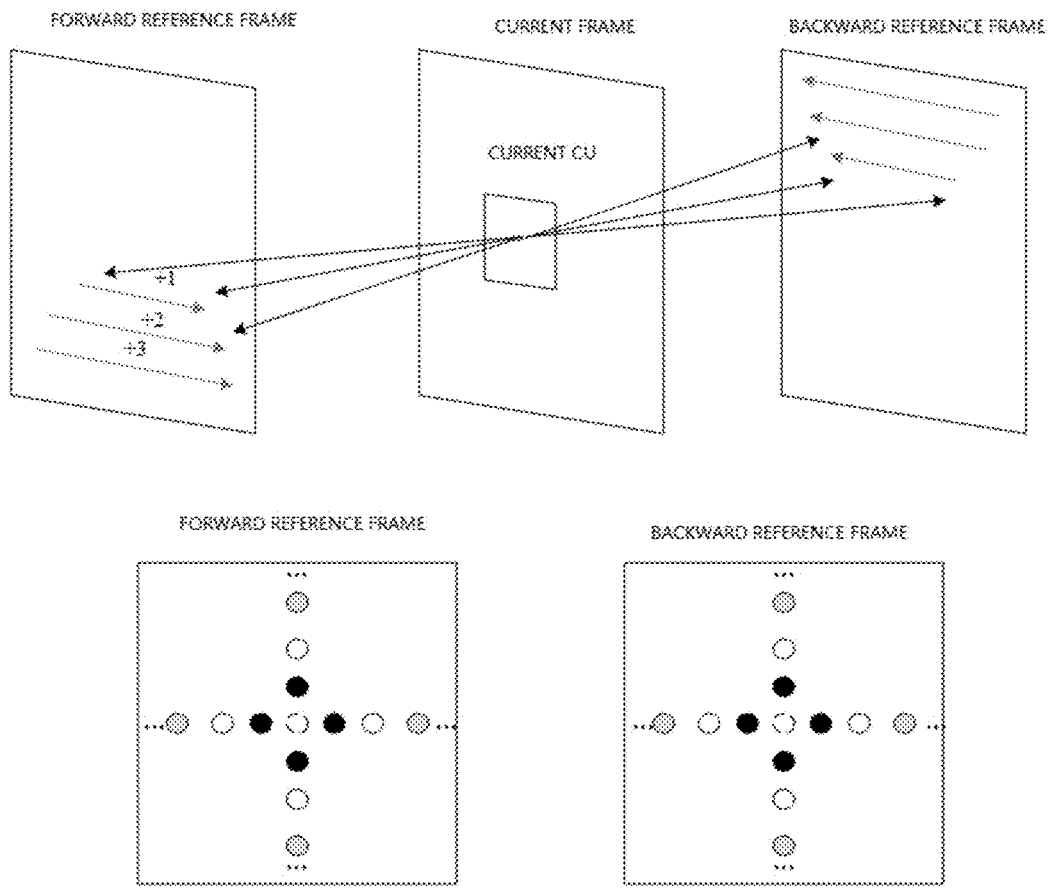
FIG. 1 is a schematic diagram illustrating using intra prediction to determine search positions.

In the merge with motion vector difference (MMVD) technology, a motion vector candidate list of a current coding unit (CU) is obtained through a process of constructing a merging candidate list in versatile video coding (VVC). Then, perform syntax expansion on each candidate in the list as follows. As illustrated in FIG. 1, take each candidate as an initial motion vector, and with a position pointed by the candidate in the reference picture as a starting point, search with 8 different step lengths in four directions: up, down, left, and right. For each initial motion vector, with each step length in each direction, a new motion vector can be formed, and perform motion compensation based on the motion vector to obtain a prediction value of the current CU. Then perform rate-distortion cost comparison on all current prediction values to select an optimal combination of syntax elements, and record three syntax elements including an index of a position of the initial motion vector in the merging candidate list, a motion direction index, and a search step length index.

Considering the compromise between algorithm complexity and performance, at present, in the algorithm the first two candidates in the merging candidate list are taken as initial motion vectors. For indexes of initial motion vectors, indexes of 8 search step lengths, and indexes of 4 search directions, reference can be made to Tables 1, 2, and 3 illustrated as follows.

TABLE 1

|  | Initial motion vector index | |
| --- | --- | --- |
|  | 0 | 1 |
| Position in the merging candidate list | Candidate 1 | Candidate 2 |

TABLE 2

|  | Step length index | | | | | | | |
| --- | --- | --- | --- | --- | --- | --- | --- | --- |
|  | 0 | 1 | 2 | 3 | 4 | 5 | 6 | 7 |
| Pixel distance | ¼ | ½ | 1 | 2 | 4 | 8 | 16 | 32 |

TABLE 3

|  | Direction index | | | |
| --- | --- | --- | --- | --- |
|  | 0 | 1 | 2 | 3 |
| X-axis | + | − |  |  |
| Y-axis |  |  | + | − |

When selecting a new motion vector based on the above-mentioned MMVD technology, the use of the 8 search step lengths is not perfect. By counting the probability that the 8 step lengths are selected in the standard test sequence of VVC, it can be found that for each test sequence, the probability that the first four search step lengths (i.e., ¼, ½, 1, and 2) are selected almost exceeds 90%, so remaining 4 step lengths are not fully utilized, thereby reducing coding efficiency. In addition, there are only 4 search directions: up, down, left, and right, so it is difficult to meet motion conditions of most objects, resulting in insufficient accuracy of motion information that can be expressed.

Figure 2:
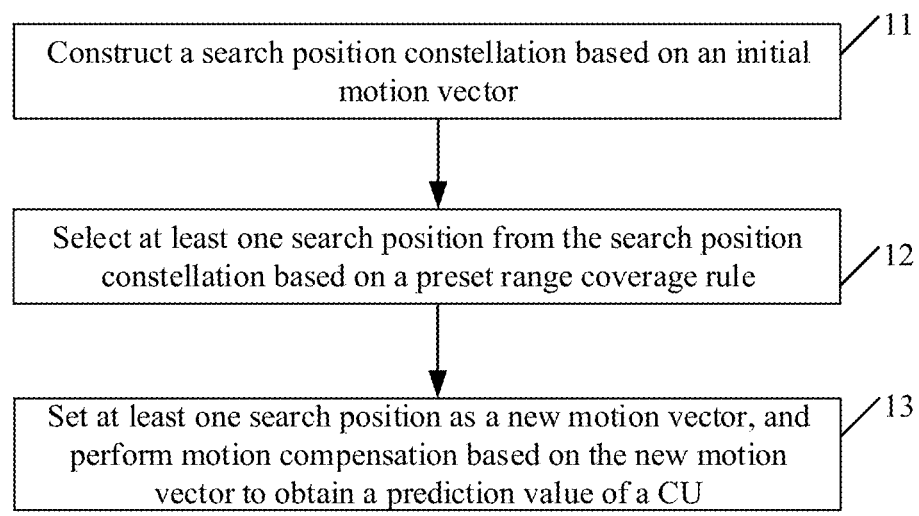
FIG. 2 is a first schematic flow chart illustrating a processing method for motion compensation provided by an implementation of the present disclosure.

Based on the above, the present disclosure provides a processing method for motion compensation. As illustrated in FIG. 2, the method includes the following.

At block 11, a search position constellation is constructed based on an initial motion vector, where the search position constellation includes N search directions, at least one search point is obtained by searching with at least one type of search step lengths in the search direction, N is an integer larger than or equal to 1, and the N search directions at least include diagonal search directions.

At block 12, at least one search position is selected from the search position constellation based on a preset range coverage rule, where the preset range coverage rule is to scatter a preset number of search points in the N search directions for selection.

At block 13, at least one search position is set as a new motion vector, and perform motion compensation based on the new motion vector to obtain a prediction value of a CU.

The method provided by the implementation can be applied to an encoder end in a video coding and decoding system.

In general, according to the above solution, available search points are first allocated according to distances in multiple search directions, the search position constellation is constructed, and then a suitable number of search positions are selected from the constellation according to the preset range coverage rule.

That is to say, in the implementation, original 4 search directions are expanded to 8 search directions on the premise that there are 32 preset search positions, then the number of search step lengths in each of the 8 search directions is reduced, and search step lengths are respectively allocated to different search directions to cover a relatively wide search range.

Constructing the search position constellation based on the initial motion vector specifically further includes constructing the search position constellation with a point pointed by the initial motion vector as a center point.

The 8 search directions are classified into two types, namely horizontal and vertical search directions and diagonal search directions.

The horizontal and vertical search directions are respectively: up, down, left, and right. The diagonal search directions are respectively: upper left, lower left, upper right, and lower right.

The search step length corresponds to a type of search directions.

The method further includes the following. If a type of a search direction is the horizontal or vertical search direction, a first set of search step lengths is adopted. If the type of the search direction is the diagonal search direction, a second set of search step lengths is adopted.

On the premise that there are 32 preset search positions, the first set of search step lengths contains at least one type of first search step lengths, and the second set of search step lengths contains at least one type of second search step lengths.

It can be pointed out that in the implementation, the first set of search step lengths and the second set of search step lengths may be the same or different.

If the first set of search step lengths and the second set of search step lengths are the same, it can be considered that same 4 search step lengths (a step length is a distance between a search position and the center point of the constellation) are used in the horizontal and vertical directions and the diagonal directions, respectively, to select search positions.

Alternatively, the first set of search step lengths are different from the second set of search step lengths. In this case, the first set of search step lengths and the second set of search step lengths may intersect. For example, search step lengths in the horizontal and vertical directions and search step lengths in the diagonal directions are increased staggeredly. For example, distances in the horizontal and vertical directions are preferentially selected, and then each of the search step lengths in the diagonal direction is intersected between two adjacent search step lengths in the horizontal and vertical directions. In this way, search in the diagonal directions can cover areas that cannot be searched by search in the horizontal and vertical directions.

That is to say, a second search step length of first type in the second set of search step lengths may be between a first search step length of first type and a first search step length of second type in the first set of search step lengths. Correspondingly, a first search step length of third type in the first set of search step lengths may be between a second search step length of second type and a second search step length of third type in the second set of search step lengths.

A diagonal position is expressed as (lx, ly), where lx=ly, and the search step length is expressed as a single value lx in this specification.

For example, the first search step length may be at least one of the following: ¼-pixel, ½-pixel, 2-pixel, and 4-pixel, and the second search step length may be at least one of the following: ⅛-pixel, ⅜-pixel, ¾-pixel, and 3⁄2-pixel.

The solution provided by the implementation will be described below in conjunction with the accompanying drawings.

Take the search step length increased by multiples as a radius and draw a circle with a position pointed by the initial motion vector as a center of the circle. Search step lengths in the diagonal directions are all set to be close to an edge of the circle and expand to the distance in turn, where the search step lengths in the diagonal direction can be determined based on the first set of search step lengths and the second set of search step lengths. For example, if the first set of search step lengths and the second set of search step lengths are the same, draw a circle with each of four types of first search step lengths or each of four types of second search step lengths as a radius and four circles are obtained. There are 4 search points in the diagonal direction, 4 search points in the horizontal direction, and 4 search points in the vertical direction. If the first set of search step lengths and the second set of search step lengths are different, multiple search points can be obtained in the diagonal search directions and the horizontal and vertical search directions based on 4 first search step lengths and 4 second search step lengths respectively.

Figure 3:
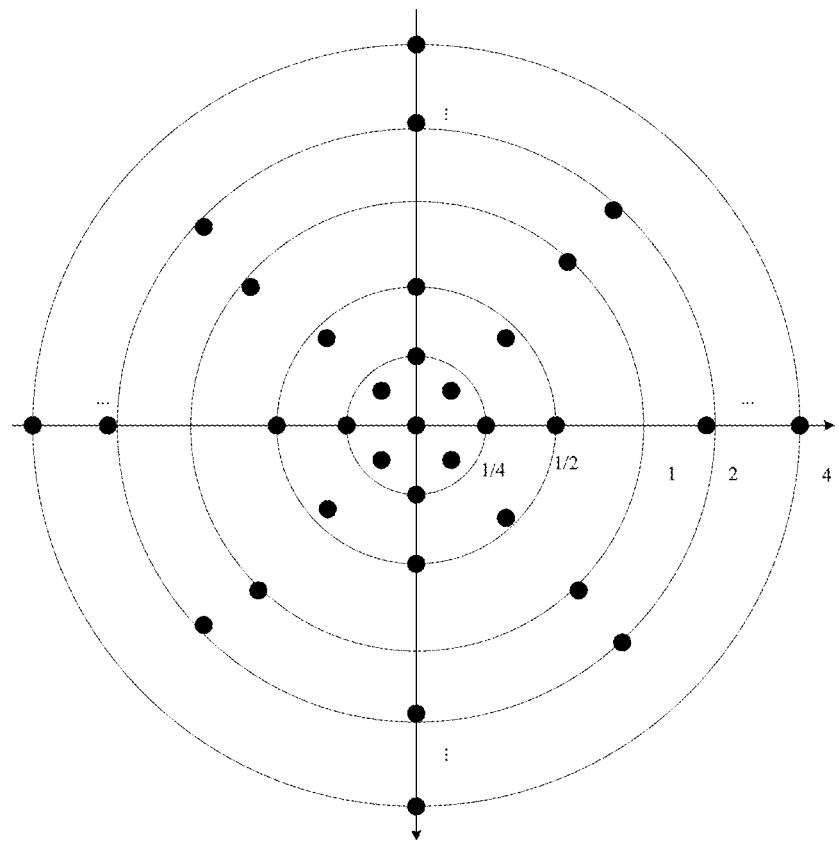
FIG. 3 is a schematic diagram illustrating determining search positions provided by an implementation of the present disclosure.

Then according to statistics, each representative search point is selected according to a coverage area, and approximated to a position that can be expressed by divided by a power of 2 based on the principle of convenient interpolation. As illustrated in FIG. 3, in both the horizontal and vertical directions a ¼-pixel position, a ½-pixel position, a 2-pixel position, and a 4-pixel position are selected, and in the diagonal direction a (⅛, ⅛) pixel position, a (⅜, ⅜) pixel position, a (¾, ¾) pixel position, and a (3⁄2,3⁄2) pixel position are selected. When selecting representative search points, considering different statistical characteristics of different resolution sequences, more search points can be allocated near a circle with a radius of ½ and a circle with a radius of 2.

The detailed illustration of implementing MMVD on this basis is as follows.

First, select initial motion vectors from the candidate list.

Specifically, the first two candidates in the merging candidate list in VVC are still reused as the initial motion vectors. For each initial motion vector, three syntax elements including an initial motion vector index, a search direction index, and a search step length index are still used for expression expansion.

Figure 4:
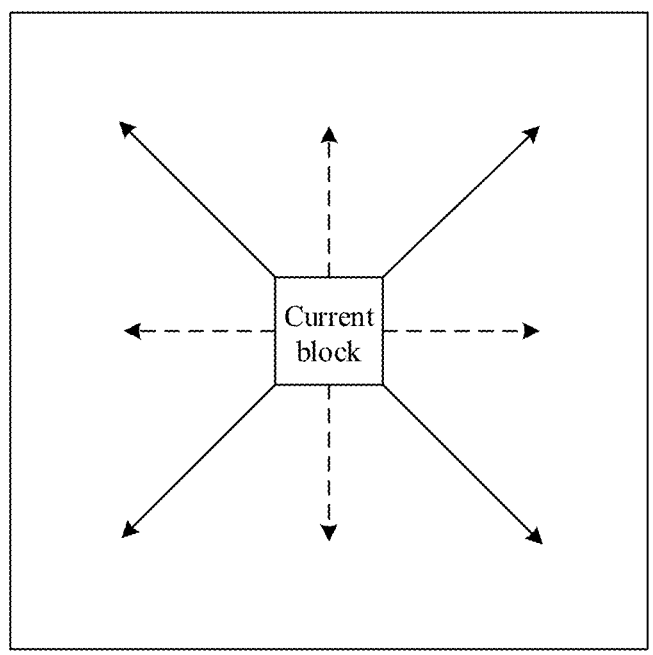
FIG. 4 is a schematic diagram illustrating search directions when being applied to merge with motion vector difference (MMVD) provided by the present disclosure.

During the expression expansion, for search directions, as illustrated in FIG. 4, the original four directions of up, down, left, and right are modified to include the four directions of up, down, left, and right, and the four directions of upper left, upper right, lower right, and lower left, that is, based on the original directions, the diagonal directions are added.

In FIG. 4, new directions are indicated via solid lines, and original directions are indicated via dashed lines. In this way, on the basis of the original horizontal and vertical directions, additional motion directions are newly added, which can increase the flexibility of motion vector expression.

An index table of search directions in the implementation is illustrated as in Table 4.

TABLE 4

| | Direction sequence | | | | | | | |
|---|---|---|---|---|---|---|---|---|
| | 0 | 1 | 2 | 3 | 4 | 5 | 6 | 7 |
| X-axis | + | − | | | + | + | − | − |
| Y-axis | | | + | − | + | − | + | − |

Then search step lengths are modified. First, reduce 8 search step lengths in the original algorithm to 4 search step lengths commonly used, as illustrated in Table 5.

TABLE 5

| | \multicolumn{4}{c}{Step length index} |
| | 0 | 1 | 2 | 3 |
|---|---|---|---|---|
| Pixel distance | ¼ | ½ | 2 | 4 |

On the basis of Table 5, in order to cover a relatively wide search range, in Table 6 in the diagonal directions search step lengths different from that in the up, down, left, and right directions are set.

TABLE 6

| | Step length index | | | |
|---|---|---|---|---|
| | 0 | 1 | 2 | 3 |
| Pixel distance in the up, down, left, and right directions | ¼ | ½ | 2 | 4 |
| Pixel distance in the diagonal directions | ⅛ | ⅜ | ¾ | 3/2 |

Figure 5:
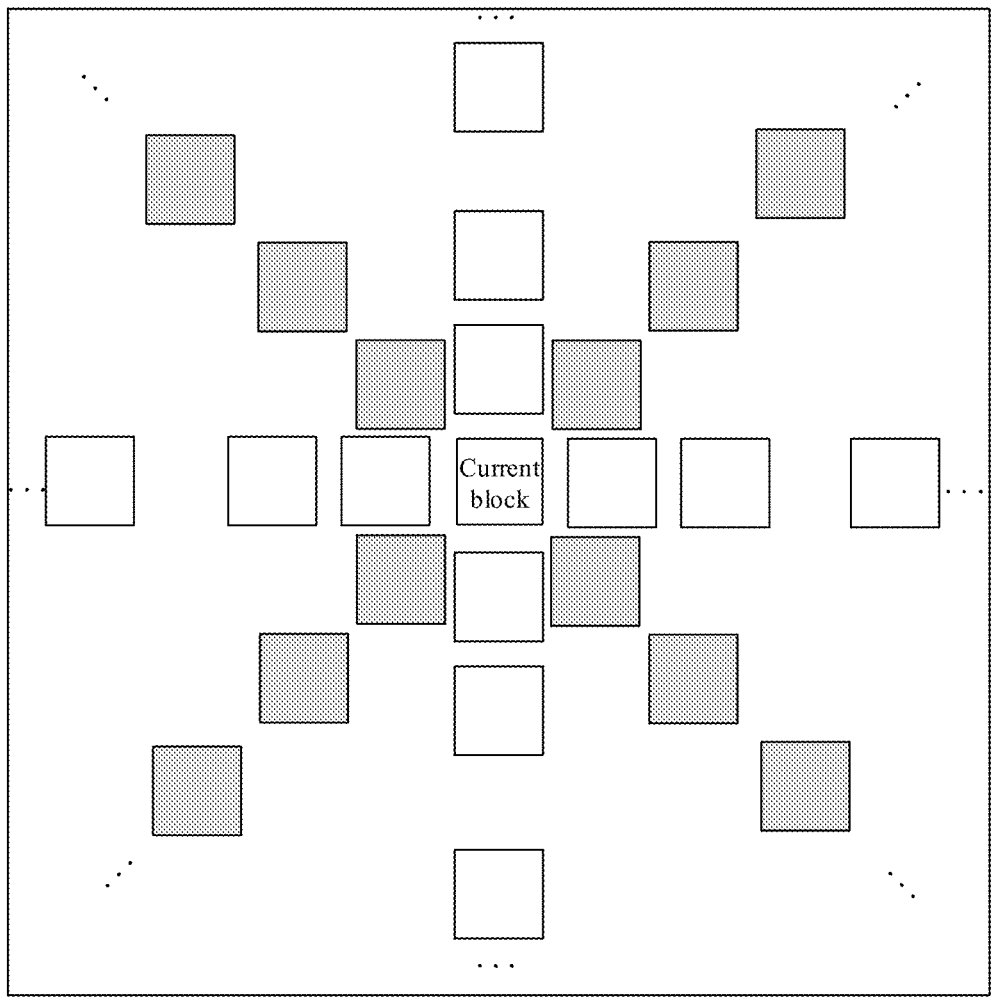
FIG. 5 is a schematic diagram illustrating obtaining multiple search positions in MMVD provided by the present disclosure.

Finally, for each initial motion vector, search directions and step lengths formed are illustrated in FIG. 5.

Based on the foregoing solution, the implementation may further include the following. At least one search position is set as a new motion vector. Motion compensation is performed based on the new motion vector to obtain the prediction value of the CU. Then the rate-distortion cost comparison is performed on all current prediction values, the optimal combination of syntax elements is selected, and three syntax elements including an index of a position of the initial motion vector in the merging candidate list, a motion direction index and a search step length index are recorded.

By adopting the above solution, a test sequence required by joint video experts team (JVET) is tested under random access conditions, and BD-rate average variations in Y, Cb, and Cr components are −0.14%, −0.12%, and 0.10%, respectively. This data represents that the technology improves coding performance.

Figure 6:
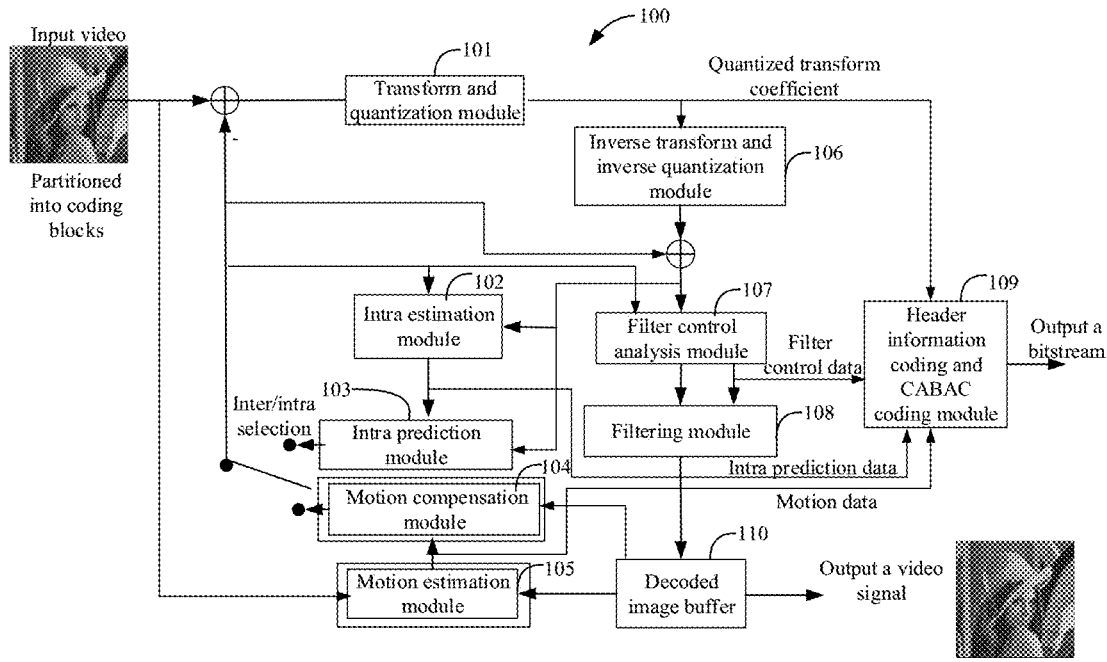
FIG. 6 is a schematic structural diagram illustrating a video coding system.
Figure 7:
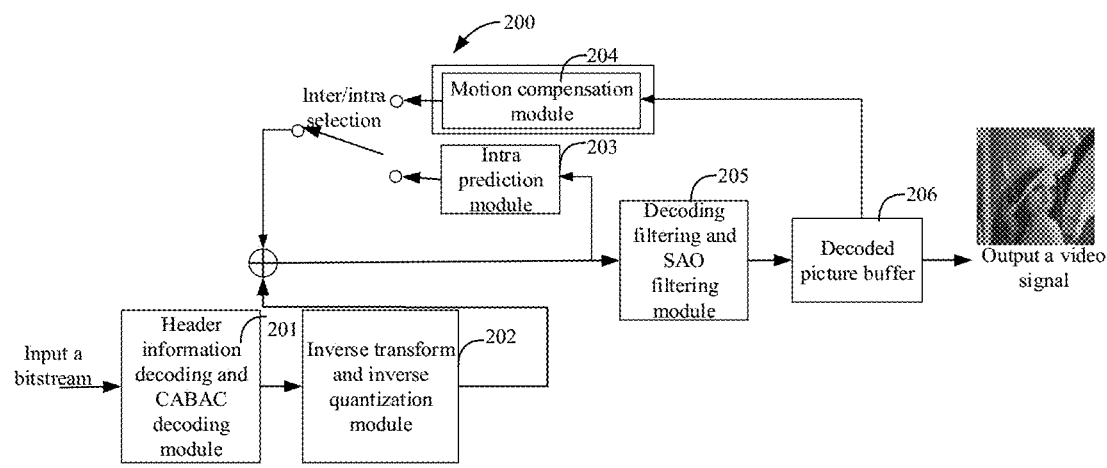
FIG. 7 is a schematic structural diagram illustrating a video decoding system.

FIG. 6 is a schematic structural diagram illustrating a video coding system. As illustrated in FIG. 6, the video coding system 100 includes a transform and quantization module 101, an intra estimation module 102, an intra prediction module 103, a motion compensation module 104, a motion estimation module 105, an inverse transform and inverse quantization module 106, a filter control analysis module 107, a deblocking filtering and sample adaptive offset (SAO) filtering module 108, a header information coding and context-based adaptive binary arithmetic coding (CABAC) coding module 109, a decoded picture buffer 110, and so on. FIG. 7 is a schematic structural diagram illustrating a video decoding system. As illustrated in FIG. 7, the video decoding system 200 includes a header information decoding and CABAC decoding module 201, an inverse transform and inverse quantization module 202, an intra prediction module 203, a motion compensation module 204, a deblocking filtering and SAO filtering module 205, a decoded picture buffer 206, and so on. A video picture is processed by parts in the video coding system 100 such as the transform and quantization module 101, the intra estimation module 102, the intra prediction module 103, the motion compensation module 104, the motion estimation module 105, the inverse transform and inverse quantization module 106, the filter control analysis module 107, the deblocking filtering and SAO filtering module 108, the header information coding and CABAC coding module 109, the decoded picture buffer 110, and so on to output a bitstream of the video picture. The bitstream is input into the video decoding system 200 and processed by parts in the video decoding system 200 such as the header information decoding and CABAC decoding module 201, the inverse transform and inverse quantization module 202, the intra prediction module 203, the motion compensation module 204 and so on, and finally the original video picture is restored.

Further, the image coding method proposed in the present disclosure can affect an intra prediction part in a video coding hybrid framework, that is, is mainly applied to the motion compensation module 104 and the motion estimation module 105 in video coding and the motion compensation module 204 in video decoding, i.e., acts on both a coding end and a decoding end.

Based on the foregoing solution, in the implementation, coding performance can be improved under a condition that the number of computations is substantially unchanged. In the related art, expression expansion on two initial motion vectors are needed, and a total of 2*4*8=64 comparisons are required, where 2 represents 2 initial motion vectors, 4 represents search directions, and 8 represents search step lengths. After modification, still perform expression expansion on 2 initial motion vectors, and a total of 2*8*4=64 comparisons are required, where 8 search directions and 4 search step lengths are included. It can be seen that this technology can improve the overall coding performance while maintaining the same amount of computations as the original technology.

Correspondingly, based on the foregoing solution, the complexity of the decoding end can be kept unchanged. In the related art, at the decoding end, expression expansion on the initial motion vector is performed by decoding three syntax elements, so as to perform motion compensation and finally obtain a reconstructed block. In the solution, expression expansion on the initial motion vector is performed still by decoding three syntax elements, so the complexity remains unchanged.

It can be seen that according to the solution provided by the implementation, search positions can be determined based on 8 search directions and 4 search step lengths corresponding to each direction. In this way, compared with the related art, the number of search step lengths in each direction is reduced, thereby avoiding a problem of reduced coding efficiency due to that some of the search step lengths are not selected, and by increasing the search directions, it can be ensured that motion conditions of most objects can be satisfied, so that motion information can be expressed more accurately.

Figure 8:
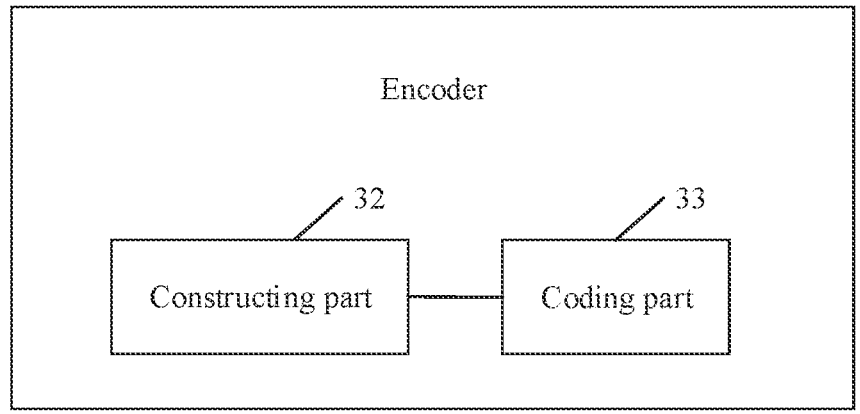
FIG. 8 is a schematic structural diagram illustrating constitution of an encoder provided by an implementation of the present disclosure.

Based on the above, an implementation provides an encoder. As illustrated in FIG. 8, the encoder includes a constructing part 32 and a coding part 33.

The constructing part 32 is configured to construct a search position constellation based on an initial motion vector, where the search position constellation includes N search directions, at least one search point is obtained by searching with at least one type of search step lengths in the search direction, N is an integer larger than or equal to 1, and the N search directions at least include diagonal search directions.

The coding part 33 is configured to select at least one search position from the search position constellation based on a preset range coverage rule, set at least one search position as a new motion vector, and perform motion compensation based on the new motion vector to obtain a prediction value of a CU, where the preset range coverage rule is to scatter a preset number of search points in the N search directions for selection.

The method provided in the implementation can be applied to an encoder end in a video coding and decoding system.

That is to say, in the implementation, original 4 search directions are expanded to 8 search directions on the premise that there are 32 preset search positions, then the number of search step lengths in each of the 8 search directions is reduced, and search step lengths are respectively allocated to different search directions to cover a relatively wide search range.

Specifically, the constructing part is configured to construct the search position constellation with a point pointed by the initial motion vector as a center point.

The N search directions in the search position constellation further include horizontal and vertical search directions. The horizontal and vertical search directions are respectively: up, down, left, and right. The diagonal search directions are respectively: upper left, lower left, upper right, and lower right.

The search step length corresponds to a type of a search direction. The coding part is configured to adopt a first set of search step lengths if the type of the search direction is the horizontal or vertical search direction, and adopt a second set of search step lengths if the type of the search direction is the diagonal search direction.

On the premise that there are 32 preset search positions, the first set of search step lengths includes at least one type of first search step lengths, and the second set of search step lengths includes at least one type of second search step lengths.

It can be pointed out that in the implementation, the first set of search step lengths and the second set of search step lengths may be the same or different.

If the first set of search step lengths and the second set of search step lengths are the same, it can be considered that same 4 search step lengths (a step length is a distance between a search position and the center point of the constellation) are used in the horizontal and vertical directions and the diagonal directions, respectively, to select search positions.

Alternatively, the first set of search step lengths and the second set of search step lengths are different from each other. In this case, the first set of search step lengths and the second set of search step lengths may intersect. For example, search step lengths in the horizontal and vertical directions and search step lengths in the diagonal directions are increased staggeredly. For example, distances in the horizontal and vertical directions are preferentially selected, and then each of search step lengths in the diagonal direction is intersected between two adjacent search step lengths in the horizontal and vertical directions. In this way, the search in the diagonal directions can cover areas that cannot be searched by search in the horizontal and vertical directions.

That is to say, a second search step length of first type in the second set of search step lengths may be between a first search step length of first type and a first search step length of second type in the first set of search step lengths. Correspondingly, a first search step length of third type in the first set of search step lengths may be between a second search step length of second type and a second search step length of third type in the second set of search step lengths.

A diagonal position is expressed as (lx, ly), where lx=ly, and the search step length is expressed as a single value lx in this specification.

For example, the first search step length may be at least one of the following: ¼-pixel, ½-pixel, 2-pixel, 4-pixel, and the second search step length may be at least one of the following: ⅛-pixel, ⅜-pixel, ¾-pixel, and 3/2-pixel.

The solution provided by the implementation will be described below in conjunction with the accompanying drawings.

Take the search step length increased by multiples as a radius and draw a circle with a position pointed by the initial motion vector as a center of the circle. Search step lengths in the diagonal directions are all set to be close to an edge of the circle and expand to the distance in turn, where the search step lengths in the diagonal direction can be determined based on the first set of search step lengths and the second set of search step lengths. For example, if the first set of search step lengths and the second set of search step lengths are the same, draw a circle with each of four types of first search step lengths or each of four types of second search step lengths as a radius and four circles are obtained. There are 4 search points in the diagonal direction, 4 search points in the horizontal direction, and 4 search points in the vertical direction. If the first set of search step lengths and the second set of search step lengths are different from each other, multiple search points can be obtained in the diagonal search directions and the horizontal and vertical search directions based on 4 first search step lengths and 4 second search step lengths respectively.

Then according to statistics, each representative search point is selected according to a coverage range, and approximated to a position that can be expressed by divided by a power of 2 based on the principle of convenient interpolation. As illustrated in FIG. 3, in both the horizontal and vertical directions a ¼-pixel position, a ½-pixel position, a 2-pixel position, and a 4-pixel position are selected, and in the diagonal direction a (⅛, ⅛) pixel position, a (⅜,⅜) pixel position, a (¾,¾) pixel position, and a (3/2,3/2) pixel position are selected. When selecting representative search points, considering different statistical characteristics of different resolution sequences, more search points can be allocated near a circle with a radius of ½ and a circle with a radius of 2.

The detailed illustration of implementing MMVD on this basis is as follows.

First, select initial motion vectors from the candidate list.

Specifically, the first two candidates in the merging candidate list in VVC are still reused as initial motion vectors. For each initial motion vector, three syntax elements including an initial motion vector index, a search direction index, and a search step length index are still used for expression expansion.

During the expression expansion, for search directions, as illustrated in FIG. 4, the original four directions of up, down, left, and right are modified to include the four directions of up, down, left, and right, and the four directions of upper left, upper right, lower right, and lower left, that is, based on the original directions, the diagonal directions are added.

In FIG. 4, new directions are indicated via solid lines, and original directions are indicated via dashed lines. In this way, on the basis of the original horizontal and vertical directions, additional motion directions are newly added, which can increase the flexibility of motion vector expression.

An index table of search directions in the implementation is illustrated as in Table 4.

TABLE 4

| | Direction sequence | | | | | | | |
|---|---|---|---|---|---|---|---|---|
| | 0 | 1 | 2 | 3 | 4 | 5 | 6 | 7 |
| X-axis | + | − | | | + | + | − | − |
| Y-axis | | | + | − | + | − | + | − |

Then search step lengths are modified. First, reduce 8 search step lengths in the original algorithm to 4 search step lengths commonly used, as illustrated in Table 5.

TABLE 5

| | Step length index | | | |
|---|---|---|---|---|
| | 0 | 1 | 2 | 3 |
| Pixel distance | ¼ | ½ | 2 | 4 |

On the basis of Table 5, in order to cover a relatively wide search range, in Table 6 in the diagonal directions search step lengths different from that in the up, down, left, and right directions are set.

TABLE 6

| | Step length index | | | |
|---|---|---|---|---|
| | 0 | 1 | 2 | 3 |
| Pixel distance in the up, down, left, and right directions | ¼ | ½ | 2 | 4 |
| Pixel distance in the diagonal directions | ⅛ | ⅜ | ¾ | 3/2 |

Finally, for each initial motion vector, search directions and step lengths formed are illustrated in FIG. 5.

Based on the foregoing solution, in the implementation the coding part sets least one search position as a new motion vector and perform motion compensation based on the new motion vector to obtain a prediction value of a CU. The coding part then performs rate-distortion cost comparison on all current prediction values, selects an optimal combination of syntax elements, and records three syntax elements including an index of a position of the initial motion vector in the merging candidate list, a motion direction index, and a search step length index.

By adopting the above solution, a test sequence required by JVET is tested under random access conditions, and BD-rate average variations in Y, Cb, and Cr components are −0.14%, −0.12%, and 0.10%, respectively. This data represents that the technology improves coding performance.

Based on the foregoing solution, in the implementation, coding performance can be improved under a condition that the number of computations is substantially unchanged. In the related art, expression expansion on two initial motion vectors is needed, and a total of 2*4*8=64 comparisons are required, where 2 represents 2 initial motion vectors, 4 represents search directions, and 8 represents search step lengths. After modification, expression expansion on 2 initial motion vectors are still performed, and a total of 2*8*4=64 comparisons are required, where 8 search directions and 4 search step lengths are included. It can be seen that this technology can improve the overall coding performance while maintaining the same amount of computations as the original technology.

Correspondingly, based on the foregoing solution, the complexity of the decoding end can be kept unchanged. In the related art, at the decoding end, expression expansion on the initial motion vector is performed by decoding three syntax elements, so as to perform motion compensation and finally obtain a reconstructed block. In the solution, the expression expansion on the initial motion vector is still performed by decoding three syntax elements, so the complexity remains unchanged.

It can be seen that according to the solution provided by the implementation, search positions can be determined based on 8 search directions and 4 search step lengths corresponding to each direction. In this way, compared with the related art, the number of search step lengths in each direction is reduced, thereby avoiding a problem of reduced coding efficiency due to that some of the search step lengths are not selected, and by increasing the search directions, it can be ensured that motion conditions of most objects can be satisfied, so that motion information can be expressed more accurately.

Figure 9:
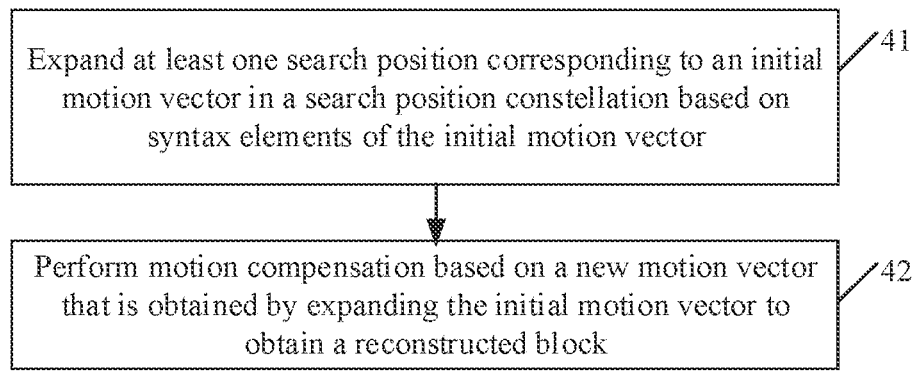
FIG. 9 is a second schematic flow chart illustrating a processing method for motion compensation provided by an implementation of the present disclosure.

An implementation provides a processing method for motion compensation. The processing method is applied to a decoder. As illustrated in FIG. 9, the processing method includes the following.

At block 41, expand at least one search position corresponding to an initial motion vector in a search position constellation based on syntax elements of the initial motion vector.

At block 42, perform motion compensation based on a new motion vector that is obtained by expanding the initial motion vector to obtain a reconstructed block.

The syntax elements include an initial motion vector index, a search direction index, and a search step length direction, where the search direction indicated in the search direction index at least includes a diagonal search direction.

Performing the motion compensation based on the new motion vector that is obtained by expanding the initial motion vector to obtain the reconstructed block can be understood as performing the motion compensation based on the new motion vector that is obtained by expanding the initial motion vector to obtain the reconstructed block of a current processing block. The current processing block is a current coding block.

The method provided in the implementation can be applied to a decoder end in a video coding and decoding system.

In general, according to the above solution, available search points are first allocated according to distances in multiple search directions, the search position constellation is constructed, and then a suitable number of search positions are selected from the constellation according to a range coverage rule.

That is to say, in the implementation, original 4 search directions are expanded to 8 search directions on the premise that there are 32 preset search positions, then the number of search step lengths in each of the 8 search directions is reduced, and search step lengths are respectively allocated to different search directions to cover a relatively wide search range.

Specifically, the search position constellation is constructed with a point pointed by the initial motion vector as a center point.

Search directions in the search position constellation further include horizontal and vertical search directions. The horizontal and vertical search directions are respectively: up, down, left, and right. The diagonal search directions are respectively: upper left, lower left, upper right, and lower right.

The search step length corresponds to a type of a search direction.

The method further includes the following. Adopt a first set of search step lengths if the type of the search direction is the horizontal or vertical search direction, and adopt a second set of search step lengths if the type of the search direction is the diagonal search direction.

On the premise that there are 32 preset search positions, the first set of search step lengths includes at least one type of first search step lengths, and the second set of search step lengths includes at least one type of second search step lengths.

It can be pointed out that in the implementation, the first set of search step lengths and the second set of search step lengths may be the same or different. If the first set of search step lengths and the second set of search step lengths are the same, it can be considered that same 4 search step lengths (a step length is a distance between a search position and the center point of the constellation) are used in the horizontal and vertical directions and the diagonal directions, respectively, to select search positions.

Alternatively, the first set of search step lengths and the second set of search step lengths are different from each other. In this case, the first set of search step lengths and the second set of search step lengths may intersect. For example, search step lengths in the horizontal and vertical directions and search step lengths in the diagonal directions are increased staggeredly. For example, distances in the horizontal and vertical directions are preferentially selected, and then each of search step lengths in the diagonal direction is intersected between two adjacent search step lengths in the horizontal and vertical directions. In this way, the search in the diagonal directions can cover areas that cannot be searched by search in the horizontal and vertical directions.

That is to say, a second search step length of first type in the second set of search step lengths may be between a first search step length of first type and a first search step length of second type in the first set of search step lengths. Correspondingly, a first search step length of third type in the first set of search step lengths may be between a second search step length of second type and a second search step length of third type in the second set of search step lengths.

A diagonal position is expressed as (lx, ly), where lx=ly, and the search step length is expressed as a single value lx in this specification.

For example, the first search step length may be at least one of the following: ¼-pixel, ½-pixel, 2-pixel, 4-pixel, and the second search step length may be at least one of the following: ⅛-pixel, ⅜-pixel, ¾-pixel, and 3/2-pixel.

The detailed illustration of implementing MMVD on this basis is as follows.

First, select initial motion vectors from the candidate list.

Specifically, first two candidates in a merging candidate list in VVC are still reused as the initial motion vectors. For each initial motion vector, three syntax elements including an initial motion vector index, a search direction index, and a search step length index are still used for expression expansion.

During the expression expansion, for search directions, as illustrated in FIG. 4, the original four directions of up, down, left, and right are modified to include the four directions of up, down, left, and right, and the four directions of upper left, upper right, lower right, and lower left, that is, based on the original directions, the diagonal directions are added.

In FIG. 4, new directions are indicated via solid lines, and original directions are indicated via dashed lines. In this way, on the basis of the original horizontal and vertical directions, additional motion directions are newly added, which can increase the flexibility of motion vector expression.

An index table of search directions in the implementation is illustrated as in Table 4.

TABLE 4

| | Direction sequence | | | | | | | |
|---|---|---|---|---|---|---|---|---|
| | 0 | 1 | 2 | 3 | 4 | 5 | 6 | 7 |
| X-axis | + | − | | | + | + | − | − |
| Y-axis | | | + | − | + | − | + | − |

Then search step lengths are modified. First, reduce 8 search step lengths in the original algorithm to 4 search step lengths commonly used, as illustrated in Table 5.

TABLE 5

| | Step length index | | | |
|---|---|---|---|---|
| | 0 | 1 | 2 | 3 |
| Pixel distance | ¼ | ½ | 2 | 4 |

On the basis of Table 5, in order to cover a relatively wide search range, in Table 6 in the diagonal directions search step lengths different from that in the up, down, left, and right directions are set.

TABLE 6

| | Step length index | | | |
|---|---|---|---|---|
| | 0 | 1 | 2 | 3 |
| Pixel distance in the up, down, left, and right directions | ¼ | ½ | 2 | 4 |
| Pixel distance in the diagonal directions | ⅛ | ⅜ | ¾ | 3/2 |

Finally, for each initial motion vector, search directions and step lengths formed are illustrated in FIG. 5.

Based on the foregoing solution, the implementation may further include the following. Perform the motion compensation based on the new motion vector that is obtained by expanding the initial motion vector to obtain the reconstructed block.

FIG. 7 is a schematic structural diagram illustrating a video decoding system. As illustrated in FIG. 7, the video decoding system 200 includes the header information decoding and CABAC decoding module 201, the inverse transform and inverse quantization module 202, the intra prediction module 203, the motion compensation module 204, the deblocking filtering and SAO filtering module 205, the decoded picture buffer 206, and so on. A video picture is processed by parts in the video coding system 100 such as the transform and quantization module 101, the intra estimation module 102, the intra prediction module 103, the motion compensation module 104, the motion estimation module 105, the inverse transform and inverse quantization module 106, the filter control analysis module 107, the deblocking filtering and SAO filtering module 108, the header information coding and CABAC coding module 109, the decoded picture buffer 110, and so on to output a bitstream of the video picture. The bitstream is input into the video decoding system 200 and processed by parts in the video decoding system 200 such as the header information decoding and CABAC decoding module 201, the inverse transform and inverse quantization module 202, the intra prediction module 203, the motion compensation module 204, and so on, and finally the original video picture is restored.

Further, the image coding method proposed in the present disclosure can affect an intra prediction part in a video coding hybrid framework, that is, is mainly applied to the motion compensation module 104 and the motion estimation module 105 in video coding and the motion compensation module 204 in video decoding, i.e., acts on both a coding end and a decoding end.

Based on the foregoing solution, the complexity of the decoding end can be kept unchanged. In the related art, at the decoding end, expression expansion on the initial motion vector is performed by decoding three syntax elements, so as to perform motion compensation and finally obtain a reconstructed block. In the solution, expression expansion on the initial motion vector is performed still by decoding three syntax elements, so the complexity remains unchanged.

It is to be noted that, for a coding block in an original picture frame, at the decoder side, a coding mode adopted by the coding block is first determined, then based on the determined coding mode, a candidate list corresponding to the coding mode is established. According to the candidate list corresponding to the coding mode, a decoding parameter corresponding to the coding block is obtained. Finally, prediction decoding is performed on the coding block based on the decoding parameter corresponding to the coding block.

It is also to be noted that after the prediction coding on the coding block, the encoder will send a bitstream corresponding to the coding block to the decoder. In this way, at the decoder side, the decoding parameter can be determined according to a coding parameter and the candidate list in the bitstream.

It can be seen that according to the solution provided by the implementation, search positions can be determined based on N search directions including the diagonal search directions and multiple types of search step lengths. In this way, compared with the related art, the number of search step lengths in each direction is reduced, thereby avoiding a problem of reduced coding efficiency due to that some of the search step lengths are not selected, and by increasing the search directions, it can be ensured that motion conditions of most objects can be satisfied, so that motion information can be expressed more accurately.

Figure 10:
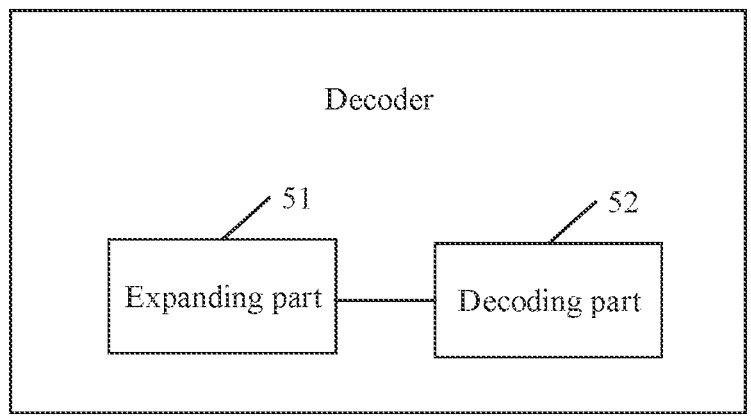
FIG. 10 is a schematic structural diagram illustrating constitution of a decoder provided by an implementation of the present disclosure.

An implementation provides a decoder. As illustrated in FIG. 10, the decoder includes an expanding part 51 and a decoding part 52.

The expanding part 51 is configured to expand at least one search position corresponding to an initial motion vector in a search position constellation based on syntax elements of the initial motion vector, where the syntax elements include an initial motion vector index, a search direction index, and a search step length direction, and a search direction indicated in the search direction index at least includes a diagonal search direction.

The decoding part 52 is configured to perform motion compensation based on a new motion vector that is obtained by expanding the initial motion vector to obtain a reconstructed block.

The method provided in the implementation can be applied to a decoder end in a video coding and decoding system.

In general, according to the above solution, available search points are first allocated according to distances in multiple search directions, the search position constellation is constructed, and then a suitable number of search positions are selected from the constellation according to a range coverage rule.

That is to say, in the implementation, original 4 search directions are expanded to 8 search directions on the premise that there are 32 preset search positions, then the number of search step lengths in each of the 8 search directions is reduced, and search step lengths are respectively allocated to different search directions to cover a relatively wide search range.

Specifically, the expanding part is configured to construct the search position constellation with a point pointed by the initial motion vector as a center point.

Search directions in the search position constellation further include horizontal and vertical search directions. The horizontal and vertical search directions are respectively: up, down, left, and right. The diagonal search directions are respectively: upper left, lower left, upper right, and lower right.

The search step length corresponds to a type of a search direction.

The expanding part 51 is configured to adopt a first set of search step lengths if the type of the search direction is the horizontal or vertical search direction, and adopt a second set of search step lengths if the type of the search direction is the diagonal search direction.

On the premise that there are 32 preset search positions, the first set of search step lengths includes at least one type of first search step lengths, and the second set of search step lengths includes at least one type of second search step lengths.

It can be pointed out that in the implementation, the first set of search step lengths and the second set of search step lengths may be the same or different.

If the first set of search step lengths and the second set of search step lengths are the same, it can be considered that same 4 search step lengths (a step length is a distance between a search position and the center point of the constellation) are used in the horizontal and vertical directions and the diagonal directions, respectively, to select search positions.

Alternatively, the first set of search step lengths and the second set of search step lengths are different from each other. In this case, the first set of search step lengths and the second set of search step lengths may intersect. For example, search step lengths in the horizontal and vertical directions and search step lengths in the diagonal directions are increased staggeredly. For example, distances in the horizontal and vertical directions are preferentially selected, and then each of search step lengths in the diagonal direction is intersected between two adjacent search step lengths in the horizontal and vertical directions. In this way, the search in the diagonal directions can cover areas that cannot be searched by search in the horizontal and vertical directions.

That is to say, a second search step length of first type in the second set of search step lengths may be between a first search step length of first type and a first search step length of second type in the first set of search step lengths. Correspondingly, a first search step length of third type in the first set of search step lengths may be between a second search step length of second type and a second search step length of third type in the second set of search step lengths.

A diagonal position is expressed as (lx, ly), where lx=ly, and the search step length is expressed as a single value lx in this specification.

For example, the first search step length may be at least one of the following: ¼-pixel, ½-pixel, 2-pixel, 4-pixel, and the second search step length may be at least one of the following: ⅛-pixel, ⅜-pixel, ¾-pixel, and 3/2-pixel.

FIG. 7 is a schematic structural diagram illustrating a video decoding system. As illustrated in FIG. 7, the video decoding system 200 includes the header information decoding and CABAC decoding module 201, the inverse transform and inverse quantization module 202, the intra prediction module 203, the motion compensation module 204, the deblocking filtering and SAO filtering module 205, the decoded picture buffer 206, and so on. A video picture is processed by parts in the video coding system 100 such as the transform and quantization module 101, the intra estimation module 102, the intra prediction module 103, the motion compensation module 104, the motion estimation module 105, the inverse transform and inverse quantization module 106, the filter control analysis module 107, the deblocking filtering and SAO filtering module 108, the header information coding and CABAC coding module 109, the decoded picture buffer 110, and so on to output a bitstream of the video picture. The bitstream is input into the video decoding system 200 and processed by parts of the video decoding system 200 such as the header information decoding and CABAC decoding module 201, the inverse transform and inverse quantization module 202, the intra prediction module 203, the motion compensation module 204, and so on, and finally the original video picture is restored.

Further, the image coding method proposed in the present disclosure can affect an intra prediction part in a video coding hybrid framework, that is, is mainly applied to the motion compensation module 104 and the motion estimation module 105 in video coding and the motion compensation module 204 in video decoding, i.e., acts on both a coding end and a decoding end.

Based on the foregoing solution, the complexity of the decoding end can be kept unchanged. In the related art, at the decoding end, expression expansion on the initial motion vector is performed by decoding three syntax elements, so as to perform motion compensation and finally obtain a reconstructed block. In the solution, expression expansion on the initial motion vector is performed still by decoding three syntax elements, so the complexity remains unchanged.

It is to be noted that, for a coding block in an original picture frame, at the decoder side, a coding mode adopted by the coding block is first determined, then based on the determined coding mode, a candidate list corresponding to the coding mode is established. According to the candidate list corresponding to the coding mode, a decoding parameter corresponding to the coding block is obtained. Finally, prediction decoding is performed on the coding block based on the decoding parameter corresponding to the coding block.

It is also to be noted that after the prediction coding on the coding block, the encoder will send a bitstream corresponding to the coding block to the decoder. In this way, at the decoder side, the decoding parameter can be determined according to a coding parameter and the candidate list in the bitstream.

It can be seen that according to the solution provided by the implementation, search positions can be determined based on N search directions including the diagonal search directions and multiple types of search step lengths. In this way, compared with the related art, the number of search step lengths in each direction is reduced, thereby avoiding a problem of reduced coding efficiency due to that some of the search step lengths are not selected, and by increasing the search directions, it can be ensured that motion conditions of most objects can be satisfied, so that motion information can be expressed more accurately.

Figure 11:
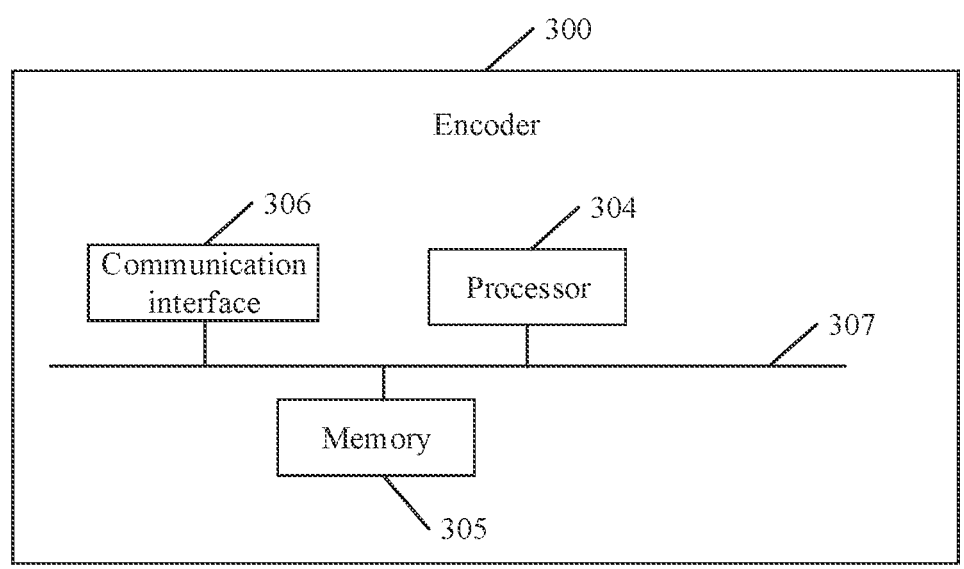
FIG. 11 is a schematic structural diagram illustrating hardware constitution provided by an implementation of the present disclosure.

FIG. 11 is a schematic diagram illustrating hardware constitution provided by an implementation of the present disclosure. Hardware in the figure may be the aforementioned encoder or decoder. As illustrated in FIG. 11, an encoder 300 provided in the implementation of the present disclosure may also include a processor 304, a memory 305 storing instructions capable of being executed by the processor 304, a communication interface 306, and a bus 307 configured to connect the processor 304, the memory 305, and the communication interface 306.

Further, in the implementation of the present disclosure, the aforementioned processor 304 is configured to execute processing in the aforementioned encoder or decoder.

In the implementation of the present disclosure, the above-mentioned processor 304 may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller, and a microprocessor. It is to be understood that for different apparatuses, the electronic devices used to implement the above-mentioned processor functions may also be other, which is not specifically limited in the implementation of the present disclosure. The memory 305 may be connected to the processor 304, where the memory 305 is configured to store executable program codes. The program codes include computer operation instructions. The memory 305 may include a high-speed random access memory (RAM), and may also include a non-volatile memory, for example, at least two disk storage devices.

In the implementation of the present disclosure, the bus 307 is configured to connect the communication interface 306, the processor 304, and the memory 305, and used for mutual communication among these devices.

In the implementation of the present disclosure, the memory 305 is configured to store instructions and data.

In practical applications, the aforementioned memory 305 may be a volatile memory, such as a RAM, or a non-volatile memory such as a read-only memory (ROM), a flash memory, a hard disk drive (HDD) or a solid-state drive (SSD), or a combination of the above types of memory, and can provide the processor with instructions and data.

In addition, the functional modules in the implementation may be integrated into one processing unit, or each unit may exist alone physically, or two or more units may be integrated into one unit. The above-mentioned integrated unit can be realized in the form of hardware or a software function module.

If the integrated unit is implemented in the form of a software function module and is not sold or used as an independent product, it can be stored in a computer-readable storage medium. Based on this understanding, in the implementation, the essential technical solution, the part that contributes to the related art, or all or part of the technical solution can be embodied in the form of a software product. The computer software product is stored in a storage medium and includes various instructions to enable a computer device (which may be a personal computer, a server, or a network device, etc.) or a processor to execute all or part of the steps of the method in the implementation. The aforementioned storage medium includes various media that can store program codes such as a U disk, a mobile hard disk, a ROM, a RAM, a magnetic disk, or an optical disk.

An implementation of the present disclosure provides a picture encoder configured to perform processing in the aforementioned encoder.

An implementation of the present disclosure further provides a decoder configured to perform processing in the aforementioned decoder.

An implementation of the present disclosure provides a computer-readable storage medium that stores a program. When the program is executed by a processor, the method as described in the above-mentioned implementation is implemented.

Those skilled in the art can understand that the implementation of the present disclosure can provide a method, a system, or a computer program product. Therefore, the present disclosure may adopt the form of a hardware implementation, a software implementation, or an implementation combining software and hardware. Moreover, the present disclosure may adopt the form of a computer program product implemented on one or more computer-usable storage media (including but not limited to a disk memory, an optical memory, etc.) including computer-usable program codes.

The present disclosure is described with reference to flow charts and/or block diagrams of the methods, equipment (systems), and computer program products according to the implementations of the present disclosure. It can be understood that each process and/or block in the schematic flow chart and/or block diagram or a combination of processes and/or blocks in the schematic flow chart or block diagram can be realized by computer program instructions. These computer program instructions can be provided to a processor of a general-purpose computer, a special-purpose computer, an embedded processor, or other programmable data processing equipment to generate a machine, so that instructions executed by the processor of the computer or other programmable data processing equipment generate an apparatus for implementing functions specified in one process or multiple processes in the schematic flow chart and/or one block or multiple blocks in the block diagram.

These computer program instructions can also be stored in a computer-readable memory that can direct a computer or other programmable data processing equipment to work in a specific manner, so that instructions stored in the computer-readable memory produce a manufacture article including an instruction apparatus. The instruction apparatus realizes functions specified in one or more processes in the schematic flow diagram and/or one block or more blocks in the block diagram.

These computer program instructions can also be loaded on a computer or other programmable data processing equipment, so that a series of operation steps are executed on the computer or other programmable equipment to produce computer-implemented processing, so that instructions executed on the computer or other programmable equipment are used for implementing functions specified in one or more processes in the schematic flow chart and/or one block or more blocks in the block diagram.

The above are only preferred implementations of the present disclosure, and are not used to limit the protection scope of the present disclosure.

INDUSTRIAL APPLICABILITY

The implementations of the present disclosure provide the processing method for motion compensation, the encoder, and the storage medium. The encoder constructs the search position constellation based on the initial motion vector, where the search position constellation includes the N search directions, and at least one search point is obtained by searching with at least one type of search step length in the search direction, N is an integer greater than or equal to 1, and the N search directions at least include the diagonal search directions. The encoder selects at least one search position from the search position constellation based on a preset range coverage rule, where the preset range coverage rule is to scatter a preset number of search points in the N search directions for selection. The encoder sets at least one search position as the new motion vector, and performs motion compensation on the new motion vector to obtain the prediction value of the CU. In this way, compared with the related art, the number of search step lengths in each direction is reduced, thereby avoiding the problem of reduced coding efficiency due to that some of the search step lengths are not selected, and by increasing the search directions, it can be ensured that motion conditions of most objects can be satisfied, so that motion information can be expressed more accurately.

What is claimed is:

1. A processing method for motion compensation, applied to a decoder and comprising:
   determining a search position constellation with a point pointed to by an initial motion vector as a center point, wherein the search position constellation comprises N directions,
      wherein N is an integer larger than or equal to two,
      wherein N directions include a first type of direction and a second type of direction,
      wherein the first type of direction includes a horizontal direction or a vertical direction,
      wherein the horizontal direction includes left or right relative to the center point, or the vertical direction includes up or down relative to the center point,
      wherein the second type of direction includes a diagonal direction,
      wherein the diagonal direction includes upper left, lower left, upper right, or lower right relative to the center point,
      wherein determining the search position constellation includes searching for one or more search points by using sets of step lengths in the N directions,
      wherein searching for the one or more search points includes adopting a first set of step lengths for the first type of direction and adopting a second set of step lengths for the second type of direction,
      wherein adjacent step lengths of the first set are separated from one another by a same first distance as other adjacent step lengths of the first set,
      wherein adjacent step lengths of the second set are separated from one another by a same second distance as other adjacent step lengths of the second set, and
      wherein the one or more search points comprise (a) at least one search point in the diagonal direction and (b) at least one search point in the horizontal direction or the vertical direction;
   searching for at least one search position from the search position constellation based on a preset range coverage rule, wherein the preset range coverage rule is to arrange search points in the directions for search;

obtaining a new motion vector according to the at least one search position; and performing motion compensation based on the new motion vector to obtain a prediction value of a coding unit (CU).

2. The method of claim 1, wherein the second same distance is different from the first same distance.

3. The method of claim 1, wherein the first and second sets of step lengths include at least one of the following step lengths: ⅛-pixel, ¼-pixel, ⅜ pixel, ½-pixel, ¾-pixel, 3⁄2-pixel, 2-pixel, or 4-pixel.

4. A method for motion compensation, applied to an encoder and comprising:

determining a search position constellation with a point pointed to by an initial motion vector as a center point, wherein the search position constellation comprises N directions, wherein N is an integer larger than or equal to two, wherein N directions include a first type of direction and a second type of direction, wherein the first type of direction includes a horizontal direction or a vertical direction, wherein the horizontal direction includes left or right relative to the center point, or the vertical direction includes up or down relative to the center point, wherein the second type of direction includes a diagonal direction, wherein the diagonal direction includes upper left, lower left, upper right, or lower right relative to the center point, wherein determining the search position constellation includes searching for one or more search points by using sets of step lengths in the N directions, wherein searching for the one or more search points includes adopting a first set of step lengths for the first type of direction and adopting a second set of step lengths for the second type of direction, wherein adjacent step lengths of the first set are separated from one another by a same first distance as other adjacent step lengths of the first set, wherein adjacent step lengths of the second set are separated from one another by a same second distance as other adjacent step lengths of the second set, and wherein the one or more search points comprise (a) at least one search point in the diagonal direction and (b) at least one search point in the horizontal direction or the vertical direction;

searching for at least one search position from the search position constellation based on a preset range coverage rule, wherein the preset range coverage rule is to arrange search points in the directions for search;

obtaining a new motion vector according to the at least one search position; and performing motion compensation based on the new motion vector to obtain a prediction value of a coding unit (CU).

5. The method of claim 4, wherein the second same distance is different from the first same distance.

6. The method of claim 4, wherein the first and second sets of step lengths include at least one of the following step lengths: ⅛-pixel, ¼-pixel, ⅜-pixel, ½-pixel, ¾-pixel, 3⁄2-pixel, 2-pixel, or 4-pixel.

7. A decoder, comprising:

a processor; and a memory storing a computer program which, when executed by the processor, causes the processor to:

determine a search position constellation with a point pointed to by an initial motion vector as a center point, wherein the search position constellation comprises N directions, wherein N is an integer larger than or equal to two, wherein N directions include a first type of direction and a second type of direction, wherein the first type of direction includes a horizontal direction or a vertical direction, wherein the horizontal direction includes left or right relative to the center point, or the vertical direction includes up or down relative to the center point, wherein the second type of direction includes a diagonal direction, wherein the diagonal direction includes upper left, lower left, upper right, or lower right relative to the center point, wherein determining the search position constellation includes searching for one or more search points by using sets of step lengths in the N directions, wherein searching for the one or more search points includes adopting a first set of step lengths for the first type of direction and adopting a second set of step lengths for the second type of direction, wherein adjacent step lengths of the first set are separated from one another by a same first distance as other adjacent step lengths of the first set, wherein adjacent step lengths of the second set are separated from one another by a same second distance as other adjacent step lengths of the second set, and wherein the one or more search points comprise (a) at least one search point in the diagonal direction and (b) at least one search point in the horizontal direction or the vertical direction;

search for at least one search position from the search position constellation based on a preset range coverage rule, wherein the preset range coverage rule is to arrange search points in the directions for search;

obtain a new motion vector according to the at least one search position; and perform motion compensation based on the new motion vector to obtain a prediction value of a coding unit (CU).

8. The decoder of claim 7, wherein the second same distance is different from the first same distance.

9. The decoder of claim 7, wherein the first and second sets of step lengths include at least one of the following step lengths: ⅛-pixel, ¼-pixel, ⅜-pixel, ½-pixel, ¾-pixel, 3⁄2-pixel, 2-pixel, or 4-pixel.

10. An encoder, comprising:

a processor; and a memory storing a computer program which, when executed by the processor, causes the processor to:

determine a search position constellation with a point pointed to by an initial motion vector as a center point, wherein the search position constellation comprises N directions, wherein N is an integer larger than or equal to two, wherein N directions include a first type of direction and a second type of direction, wherein the first type of direction includes a horizontal direction or a vertical direction, wherein the horizontal direction includes left or right relative to the center point, or the vertical direction includes up or down relative to the center point, wherein the second type of direction includes a diagonal direction, wherein the diagonal direction includes upper left, lower left, upper right, or lower right relative to the center point, wherein determining the search position constellation includes searching for one or more search points by using sets of step lengths in the N directions, wherein searching for the one or more search points includes adopting a first set of step lengths for the first type of direction and adopting a second set of step lengths for the second type of direction, wherein adjacent step lengths of the first set are separated from one another by a same first distance as other adjacent step lengths of the first set, wherein adjacent step lengths of the second set are separated from one another by a same second distance as other adjacent step lengths of the second set, and wherein the one or more search points comprise (a) at least one search point in the diagonal direction and (b) at least one search point in the horizontal direction or the vertical direction;

search for at least one search position from the search position constellation based on a preset range coverage rule, wherein the preset range coverage rule is to arrange search points in the directions for search;

obtain a new motion vector according to the at least one search position; and perform motion compensation based on the new motion vector to obtain a prediction value of a coding unit (CU).

11. The encoder of claim 10, wherein the second same distance is different from the first same distance.

12. The encoder of claim 10, wherein the first and second sets of step lengths include at least one of the following step lengths: ⅛-pixel, ¼-pixel, ⅜-pixel, ½-pixel, ¾-pixel, 3/2-pixel, 2-pixel, or 4-pixel.

* * * * *